(12) United States Patent
Herault et al.

(10) Patent No.: US 10,284,798 B2
(45) Date of Patent: May 7, 2019

(54) LOW-NOISE HIGH DYNAMIC RANGE IMAGE SENSOR

(71) Applicant: STMicroelectronics (Crolles 2) SAS, Crolles (FR)

(72) Inventors: Didier Herault, Grenoble (FR); Pierre Malinge, Bernin (FR)

(73) Assignee: STMICROELECTRONICS (CROLLES 2) SAS, Crolles (FR)

( * ) Notice: Subject to any disclaimer, the term of this patent is extended or adjusted under 35 U.S.C. 154(b) by 8 days.

(21) Appl. No.: 15/730,539

(22) Filed: Oct. 11, 2017

(65) Prior Publication Data
US 2018/0220090 A1  Aug. 2, 2018

(30) Foreign Application Priority Data
Jan. 31, 2017  (FR) ...................... 17 50769

(51) Int. Cl.
| | |
|---|---|
| H04N 5/365 | (2011.01) |
| H04N 5/353 | (2011.01) |
| H04N 5/374 | (2011.01) |
| H04N 5/355 | (2011.01) |
| H04N 5/3745 | (2011.01) |
| H04N 5/235 | (2006.01) |

(52) U.S. Cl.
CPC .......... *H04N 5/365* (2013.01); *H04N 5/3537* (2013.01); *H04N 5/35572* (2013.01); *H04N 5/35581* (2013.01); *H04N 5/3741* (2013.01); *H04N 5/37452* (2013.01); *H04N 5/37457* (2013.01); *H04N 5/2357* (2013.01); *H04N 5/37455* (2013.01)

(58) Field of Classification Search
None
See application file for complete search history.

(56) References Cited

U.S. PATENT DOCUMENTS

| | | | | |
|---|---|---|---|---|
| 5,900,623 | A * | 5/1999 | Tsang | .................... H04N 5/3575 250/208.1 |
| 2013/0206964 | A1* | 8/2013 | Yamashita | ........ H01L 27/14609 250/208.1 |
| 2014/0252201 | A1 | 9/2014 | Li et al. | |
| 2014/0267861 | A1* | 9/2014 | Suh | ....................... H04N 5/3575 348/308 |
| 2015/0189199 | A1 | 7/2015 | Borremans et al. | |
| 2015/0264243 | A1 | 9/2015 | Ichikawa et al. | |
| 2016/0182839 | A1 | 6/2016 | Shigeta et al. | |
| 2017/0118424 | A1 | 4/2017 | Lule et al. | |
| 2017/0251153 | A1 | 8/2017 | Roffet | |

* cited by examiner

*Primary Examiner* — James M Hannett
(74) *Attorney, Agent, or Firm* — Seed IP Law Group LLP

(57) ABSTRACT

An image sensor includes a plurality of pixels each including a first photodiode linked to a capacitive readout node by a first transistor, and a second photodiode linked to a first capacitive storage node by a second transistor, the first capacitive node being linked to the readout node by a third transistor, and the readout node being linked to a node for applying a reset potential by a fourth transistor.

19 Claims, 5 Drawing Sheets

LOW-NOISE HIGH DYNAMIC RANGE IMAGE SENSOR

BACKGROUND

Technical Field

The present application relates to high dynamic range imaging.

Description of the Related Art

U.S. Patent Publication No. 2017/0118424, and U.S. Patent Publication No. 2017/0251153 describe exemplary embodiments of a high dynamic range image sensor. These patent applications are incorporated here by reference in their entireties under the conditions authorized by law.

A particularity of the sensor described in these patent applications is that it is especially suitable for the detection of flashing luminous sources, for example signalling lamps or traffic lights based on pulsed light-emitting diodes.

Accordingly, the sensor comprises two photodiodes per pixel, linked to one and the same readout node of the pixel, one of the two photodiodes being integrated during a first uninterrupted integration period, and the other photodiode being integrated during at least one second integration period split into a plurality of disjoint sub-periods.

Although this sensor exhibits excellent performance, it would be desirable to further improve its response, by reducing the fixed noise and/or the temporal noise generated during the acquisition of an image.

BRIEF SUMMARY

Thus, one embodiment provides an image sensor comprising a plurality of pixels each comprising a first photodiode linked to a capacitive readout node by a first transistor, and a second photodiode linked to a first capacitive storage node by a second transistor, the first capacitive node being linked to the readout node by a third transistor, and the readout node being linked to a node for applying a reset potential by a fourth transistor, the sensor furthermore comprising a drive circuit configured to, during a phase of readout of a first value representative of a level of illumination received by the second photodiode of a pixel during a first integration period, implement the following successive steps:

a) turn on and then turn back off the fourth transistor so as to reset the readout node;
b) turn on the third transistor and then read out a first signal representative of the potential of the readout node while the third transistor is on;
d) turn on the fourth transistor so as to reset the readout node and the first storage node, and then turn back off the third transistor;
e) turn back off the fourth transistor and then turn on the third transistor;
f) read out a second signal representative of the potential of the readout node while the third transistor is on; and
g) provide a first value representative of the difference between the second and first signals.

According to one embodiment, each pixel furthermore comprises a fifth transistor mounted as a source follower, whose gate is connected to the readout node, and a sixth transistor linking the source of the fifth transistor to a conducting output track of the pixel, each pixel having its output track linked to the input of an analogue-digital converter of the sensor, the drive circuit being configured to, in step a), drive the resetting of the analogue-digital converter linked to the output track of the pixel while the fourth transistor is on.

According to one embodiment, the first and second signals which are read out respectively in steps b) and f) are digital output signals of the analogue-digital converter linked to the output track of the pixel.

According to one embodiment, in each pixel, the second photodiode is furthermore linked to a second capacitive storage node by a seventh transistor, the second capacitive node being linked to the readout node by an eighth transistor, the drive circuit being configured to, during a phase of readout of a second value representative of a level of illumination received by the second photodiode of a pixel during a second integration period, implement the following successive steps:

h) turn on and then turn back off the fourth transistor so as to reset the readout node;
i) turn on the eighth transistor and then read out a third signal representative of the potential of the readout node while the eighth transistor is on;
j) turn on the fourth transistor so as to reset the readout node and the second storage node, and then turn back off the eighth transistor;
k) turn back off the fourth transistor and then turn on the eighth transistor;
l) read out a fourth signal representative of the potential of the readout node while the eighth transistor is on; and
m) provide a second value representative of the difference between the fourth and third signals.

According to one embodiment, the drive circuit is configured to, in step h), drive the resetting of the analogue-digital converter linked to the output track of the pixel while the fourth transistor is on.

According to one embodiment, each of the first and second integration periods is split into a plurality of disjoint sub-periods, the sub-periods of the first integration period and the sub-periods of the second integration period being interleaved.

According to one embodiment, the drive circuit is configured to, during a phase of readout of a third value representative of an illumination level received by the first photodiode of a pixel during a third integration period, implement the following successive steps:

n) turn on and then turn back off the fourth transistor so as to reset the readout node;
o) read out a fifth signal representative of the potential of the readout node;
p) turn on and then turn back off the first transistor so as to transfer onto the readout node the photogenerated charge contained in the first photodiode;
q) read out a sixth signal representative of the potential of the readout node; and
r) provide a third value representative of the difference between the fifth and sixth signals.

According to one embodiment, the drive circuit is configured to, between steps n) and o), drive the resetting of the analogue-digital converter linked to the output track of the pixel while the fourth transistor is off.

According to one embodiment, the third integration period is a continuous period.

According to one embodiment, in each pixel, the fourth transistor links the node for applying a reset potential to an intermediate node, each pixel furthermore comprising a ninth transistor linking the intermediate node to the readout node.

According to one embodiment, in each pixel, the fourth transistor directly links the node for applying a reset potential to the readout node.

According to one embodiment, each pixel furthermore comprises a tenth transistor linking the second photodiode to the node for applying a reset potential.

BRIEF DESCRIPTION OF THE SEVERAL VIEWS OF THE DRAWINGS

These characteristics and advantages, as well as others, will be set forth in detail in the following non-limiting description of particular embodiments, given in conjunction with the attached figures among which.

DETAILED DESCRIPTION

Like elements have been designated by like references in the various figures and, moreover, the diverse figures are not drawn to scale. For the sake of clarity, only the elements useful to the understanding of the embodiments described have been represented and are detailed. In particular, some of the diverse peripheral elements that an image sensor may include, in addition to a matrix of pixels (row and column decoders, readout circuits, analogue-digital conversion circuits, control circuits, signal processing units, etc.) have not been detailed, the embodiments described being compatible with the usual peripheral elements of an image sensor, with the help, if appropriate, of adaptations within the scope of the person skilled in the art. Unless specified to the contrary, the expressions "approximately", "substantially", "about" and "of" the order of signify to within 10%, preferably to within 5%. In the present description, the term "connected" is used to designate a direct electrical link, with no intermediate electronic component, for example by means of one or more conducting tracks, and the term "coupled" or the term "linked" is used to designate either a direct electrical link (then signifying "connected") or a link via one or more intermediate components (resistor, diode, capacitor, etc.).

Figure 1:
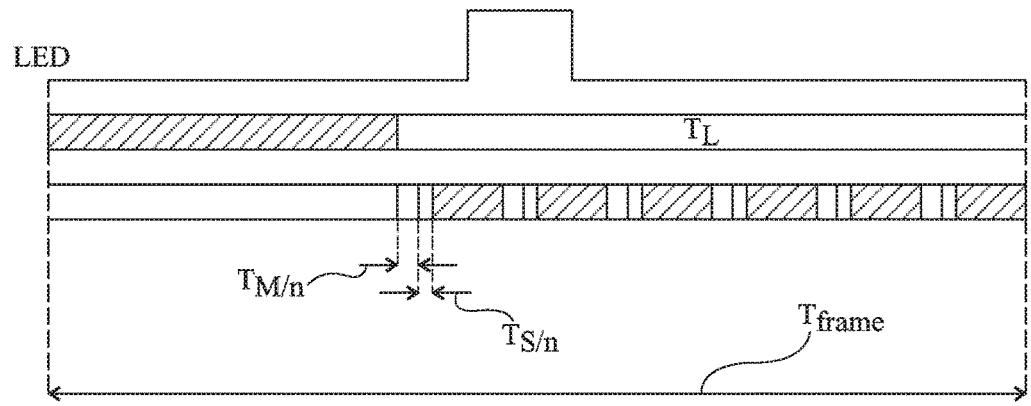
FIG. 1 schematically illustrates the operation of a high dynamic range image sensor according to an example of an embodiment.

FIG. 1 schematically illustrates the manner of operation of an example of an embodiment of a high dynamic range image sensor.

Considered here is a sensor configured to, at each period of acquisition $T_{frame}$ of a value representative of the level of illumination of a pixel, acquire three values representative of the level of illumination of the pixel, corresponding to three separate levels of exposure of the pixel, and then reconstruct a final output value of the pixel by taking account of these three values.

Considered in the example of FIG. 1 is a sensor in which each pixel comprises two separate photodiodes that may be integrated or exposed simultaneously, with separate exposure times.

Represented in FIG. 1 is a single phase of acquisition $T_{frame}$ of a value representative of the level of illumination of a pixel of the sensor. The acquisition phase $T_{frame}$ comprises an uninterrupted period of integration $T_L$ of a first photodiode of the pixel. The acquisition phase $T_{frame}$ furthermore comprises, in parallel with the integration period $T_L$, that is to say overlapping at least in part the integration period $T_L$, two periods of integration $T_M$ and $T_S$ of the second photodiode of the pixel. By way of variant (not represented), the integration periods $T_M$ and $T_S$ may be situated outside of the integration period $T_L$. In the example represented, the duration $T_L$ is greater than the duration $T_M$, which is itself greater than the duration $T_S$. The embodiments described are not however limited to this particular case. By way of variant, the durations of integration $T_S$ and $T_M$ may be substantially identical, thereby making it possible to improve the detection performance in respect of flashing luminous sources at the cost of a slight decrease in the dynamic swing. In the example of FIG. 1, the integration period $T_M$ is divided or split into n disjoint integration sub-periods of duration $T_M/n$, and the integration period $T_S$ is divided into n disjoint integration sub-periods of duration $T_S/n$, where n is an integer greater than 1, for example lying between 10 and 500. In the example represented, the integration sub-periods of the integration period $T_M$ and the integration sub-periods of the integration period $T_S$, are interleaved, that is to say that two successive sub-periods of the integration period $T_M$ are separated by a sub-period of the integration period $T_S$, and that two successive sub-periods of the integration period $T_S$ are separated by a sub-period of the integration period $T_M$. In this example, the integration sub-periods of the integration period $T_M$ and the integration sub-periods of the integration period $T_S$ are distributed over a period greater than the sum of the periods $T_M$ and $T_S$.

In the example represented, the n sub-periods of the integration period $T_M$ and the n sub-periods of the integration period $T_S$ are distributed regularly along a period substantially equal to the integration period $T_L$, and coinciding substantially with the integration period $T_L$. An advantage then resides in the temporal coherence of the measurements performed on completion of the integration periods $T_L$, $T_M$ and $T_S$. By way of variant, the n sub-periods of the integration period $T_M$ and the n sub-periods of the integration period $T_S$ may be regularly distributed along the whole of the acquisition period $T_{frame}$.

Represented moreover in FIG. 1 is an LED binary signal representative of the state of a flashing luminous source placed opposite the pixel, for example a source with pulsed light-emitting diodes. The high state of the LED signal corresponds to a lit state of the luminous source, and the low state of the LED signal corresponds to an unlit state of the luminous source. In the example represented, the luminous source is lit for about a sixth of the long integration period $T_L$, and is unlit for the whole of the remainder of the phase $T_{frame}$. The division of the integration periods $T_M$ and $T_S$ into disjoint integration sub-periods, and the spreading of these sub-periods along a period greater than the sum of the periods $T_M$ and $T_S$, increases the probability that at least one part of the integration period $T_M$ and/or at least one part of the integration period $T_S$ coincides with the lit phase of the flashing luminous source. In the example represented, a sub-period of duration $T_M/n$ of the integration period $T_M$ and a sub-period of duration $T_S/n$ of the integration period $T_S$ fall during the lit phase of the flashing luminous source. Thus, a part of the light emitted by the luminous source during the acquisition phase $T_{frame}$ is detected by the pixel and contributes to the final output value of the pixel. The provision of a period of uninterrupted integration $T_L$ on a separate photodiode makes it possible to guarantee good performance of the pixel under conditions of low luminosity.

Figure 2:
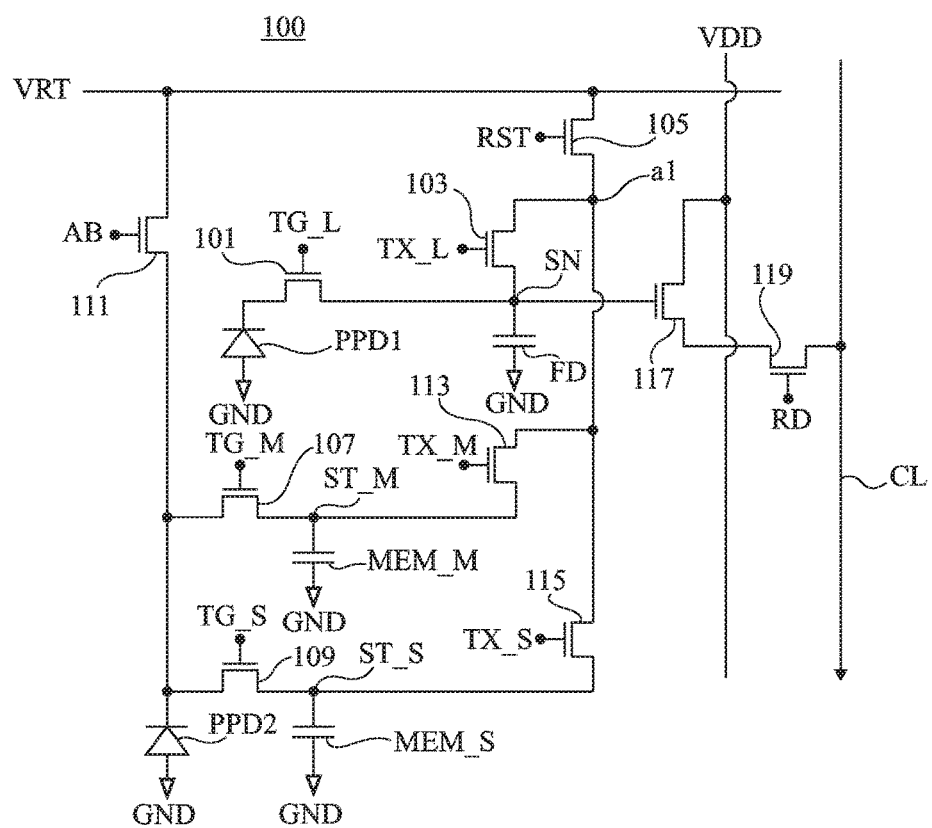
FIG. 2 is an electrical diagram of an example of an embodiment of a high dynamic range image sensor.

FIG. 2 is an electrical diagram of an example of an embodiment of a pixel 100 of a high dynamic range image sensor suitable for implementing a manner of operation of the type described in conjunction with FIG. 1. In FIG. 2, only one pixel 100 of the sensor has been represented. In practice, the sensor can comprise a plurality of identical or similar pixels disposed matrix-wise according to rows (or lines) and columns, as well as drive and readout circuits, not represented, for the pixels of the sensor.

The pixel 100 of FIG. 2 comprises a first photodiode PPD1. The anode of the photodiode PPD1 is connected to a node GND for applying a low reference potential of the sensor, for example ground. The cathode of the photodiode PPD1 is linked to a capacitive readout node SN of the pixel by way of a transfer transistor 101 whose gate is linked to a node for applying a drive signal TG_L. The capacitance of the readout node SN is represented schematically by a capacitor FD, a first electrode of which is connected to the node SN, and a second electrode of which is connected to the node GND. In practice, the capacitance FD can be made up of the parasitic capacitances of the various elements (conducting tracks, transistors) connected to the node SN. By way of variant, the capacitance FD can comprise a specific capacitor, so as to increase its maximum charges storage capacity and thus decrease the charge-to-voltage conversion gain. The readout node SN is linked to a node a1 of the pixel by way of a transistor 103 whose gate is linked to a node for applying a drive signal TX_L. The node a1 is itself linked to a node VRT for applying a high reference potential—that is to say greater than the potential of the node GND—of the sensor by way of a transistor 105 whose gate is linked to a node for applying a drive signal RST.

The pixel 100 of FIG. 2 furthermore comprises a second photodiode PPD2. The anode of the photodiode PPD2 is connected to the node GND. The cathode of the photodiode PPD2 is linked to a first capacitive storage node ST_M of the pixel by way of a transfer transistor 107 whose gate is linked to a node for applying a drive signal TG_M. The capacitance of the storage node ST_M is represented schematically by a capacitor MEM_M, a first electrode of which is connected to the node ST_M and a second electrode of which is connected to the node GND. In practice, the capacitance MEM_M can be made up of the parasitic capacitances of the various elements (conducting tracks, transistors) connected to the node ST_M. Preferably, the capacitance MEM_M comprises a specific capacitor. The capacitance MEM_M comprises for example a capacitor with vertical electrodes of CDTI ("Capacitor Deep Trench Isolation") type formed in the same semiconductor substrate as the photodiodes and transistors of the pixel. The provision of a capacitor of CDTI type advantageously makes it possible to limit the substrate area occupied by the pixel. More generally, diverse types of capacitors may be used, for example a capacitor of MOM (metal-oxide-metal) type, a capacitor of MIM (metal-isolator-metal) type, or a capacitor of MOS (metal-oxide-semiconductor) type. The capacitance MEM_M of the node ST_M is preferably greater than the capacitance FD of the node SN, so as to increase the dynamic range. The cathode of the photodiode PPD2 is furthermore linked to a second capacitive storage node ST_S of the pixel by way of a transfer transistor 109 whose gate is linked to a node for applying a drive signal TG_S. The capacitance of the storage node ST_S is represented schematically by a capacitor MEM_S, a first electrode of which is connected to the node ST_S, and a second electrode of which is connected to the node GND. In practice, the capacitance MEM_S can be made up of the parasitic capacitances of the various elements (conducting tracks, transistors) connected to the node ST_S. Preferably, the capacitance MEM_S comprises a specific capacitor. Just like the capacitance MEM_M, the capacitance MEM_S comprises for example a vertical-electrode capacitor formed in the same semiconductor substrate as the photodiodes and transistors of the pixel. The capacitance MEM_S of the node ST_S is preferably greater than the capacitance MEM_M of the node ST_M, so as to increase the dynamic range still further. The cathode of the photodiode PPD2 is moreover linked to the node VRT by way of a transistor 111 whose gate is linked to a node for applying a drive signal AB. The pixel 100 of FIG. 2 furthermore comprises a transistor 113 linking the node ST_M to the node a1, the gate of the transistor 113 being linked to a node for applying a drive signal TX_M. Moreover, the pixel 100 comprises a transistor 115 linking the node ST_S to the node a1, the gate of the transistor 115 being linked to a node for applying a drive signal TX_S.

The pixel 100 moreover comprises a transistor 117 mounted as a follower source, whose gate is connected to the readout node SN. The drain of the transistor 117 is connected to a node VDD for applying a high reference potential of the sensor, for example equal to the potential of the node VRT, or different from the potential of the node VRT. The pixel 100 furthermore comprises a transistor 119 linking the source of the transistor 117 to a conducting output track CL of the pixel, which may be common to several pixels of the sensor, for example to all the pixels of one and the same column of the sensor. The gate of the transistor 119 is linked to a node for applying a drive signal RD.

By way of variant, the pixel reading circuit, comprising the transistors 105, 117 and 119, can be shared by one or more neighbouring pixels.

In the example represented, the transistors 101, 103, 105, 107, 109, 111, 113, 115, 117 and 119 of the pixel 100 are N-channel MOS transistors. The photodiodes PPD1 and PPD2 are for example pinned photodiodes, that is to say photodiodes which are entirely depleted in the reset state. The embodiments described are not limited to these particular examples however.

The sensor of FIG. 2 furthermore comprises a control circuit (e.g., control circuit 604 of FIG. 6) providing the drive signals AB, TG_L, TG_M, TG_S, TX_L, TX_M, TX_S, RST and RD of the control transistors of the pixels of the sensor. The pixels are for example driven simultaneously row by row, that is to say that all the pixels of one and the same row simultaneously receive the same signals AB, TG_L, TG_M, TG_S, TX_L, TX_M, TX_S, RST and RD for driving their control transistors. The sensor of FIG. 2 is for example driven according to a drive method of rolling shutter type, that is to say that the drive sequence for the transistors of the pixels of one and the same row during a phase $T_{frame}$ of acquiring the output values of the pixels of the row is repeated identically for all the rows of the sensor, with a phase shift of the order of $T_{frame}$/Nb_row between two successive rows of pixels, where Nb_row designates the number of rows of pixels of the sensor.

Figure 3:
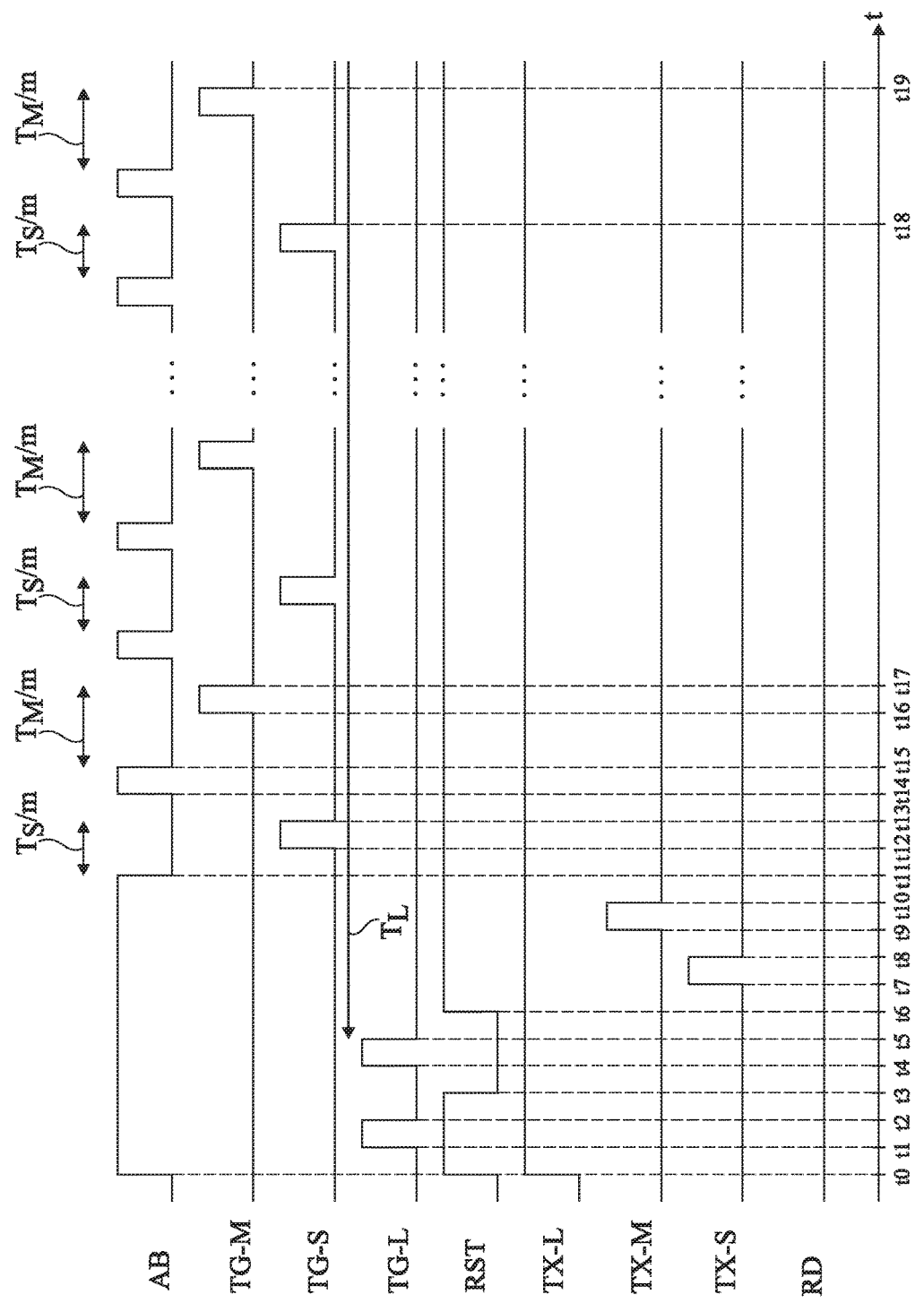
FIGS. 3 and 4 are timecharts illustrating an example of a method of driving a high dynamic range image sensor according to one embodiment.
Figure 4:
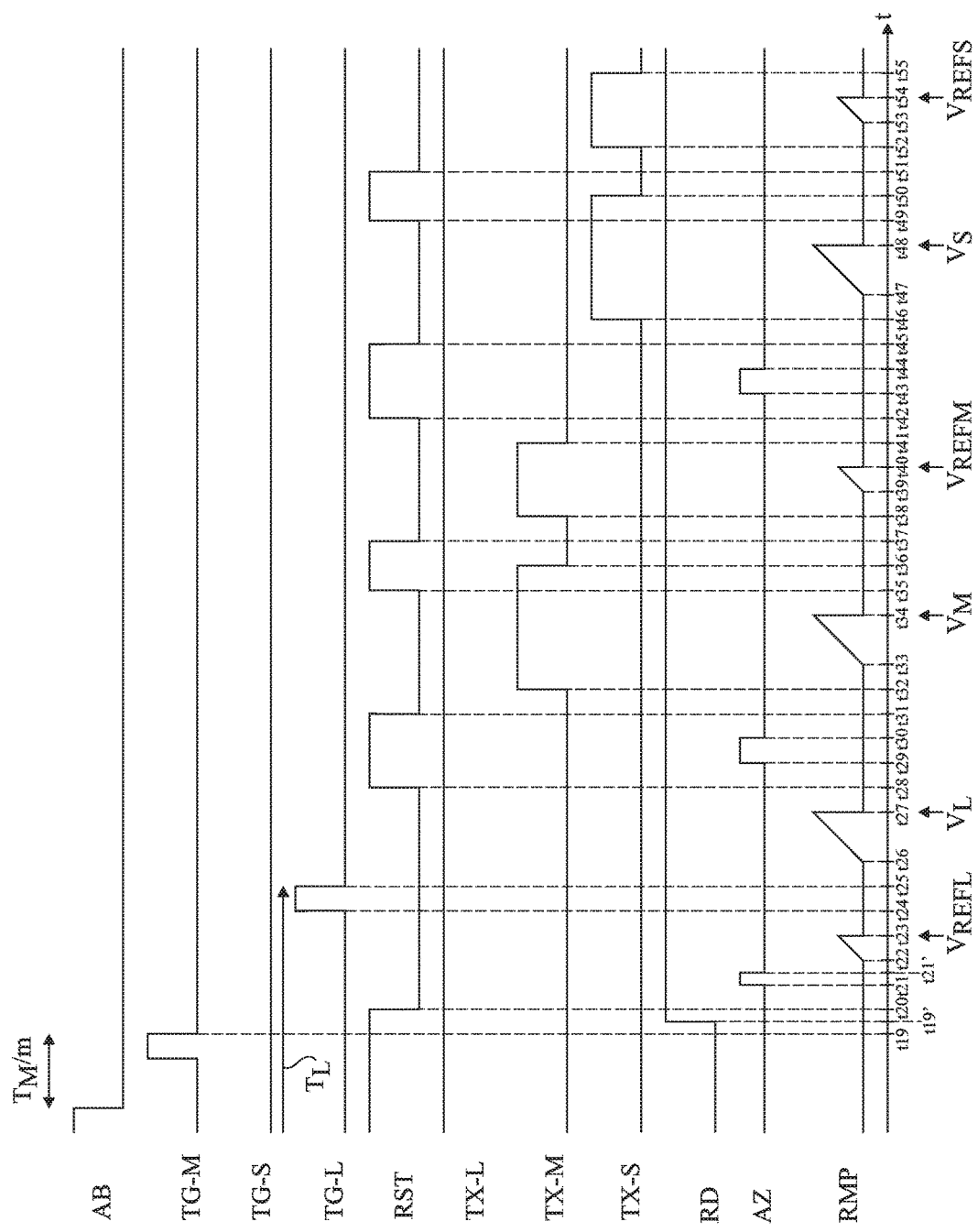

FIGS. 3 and 4 are timecharts illustrating an example of a method of driving a high dynamic range image sensor according to one embodiment. FIG. 3 represents more particularly a phase of initialization and of integration of a pixel of the sensor, during a phase of acquisition $T_{frame}$ of a value representative of the level of illumination of the pixel, and FIG. 4 represents more particularly a phase of readout of the pixel, at the end of the acquisition phase $T_{frame}$.

FIGS. 3 and 4 represent more particularly the evolution, as a function of time (t), of the drive signals AB, TG_M, TG_S, TG_L, RST, TX_L, TX_M, TX_S, and RD of the pixel 100 of FIG. 2, during a phase $T_{frame}$ of acquisition of an output value representative of the level of illumination of the pixel. FIG. 4 furthermore represents drive signals AZ and RMP of an analogue-digital converter linked to the output track CL of the pixel 100. In this example, the analogue-digital converter is a ramp-type converter, the signal AZ corresponding to a drive signal for resetting one or more capacitances of the converter, and the signal RMP corresponding to a ramp-shaped signal applied to a reference node of the converter during a phase of conversion of an analogue input value of the converter into a digital output value.

Figure 5:
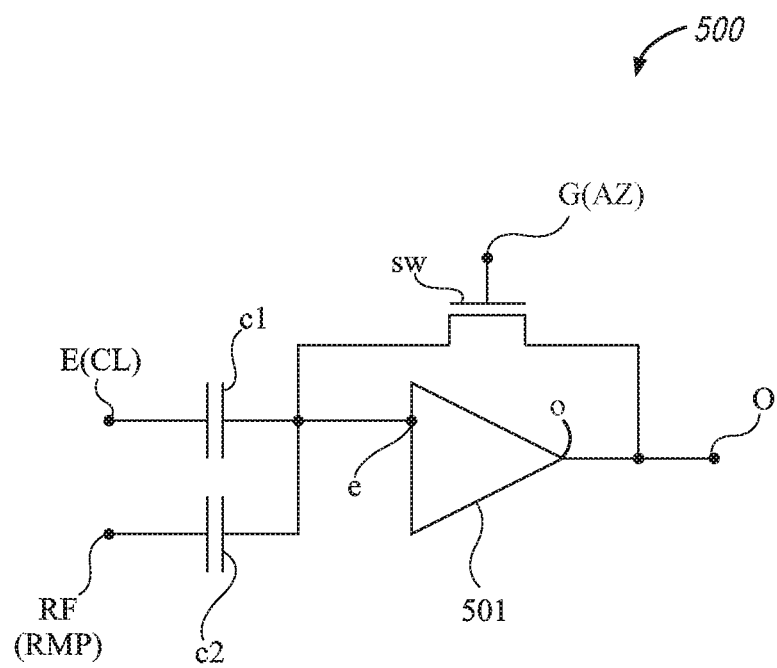
FIG. 5 is a simplified and partial electrical diagram of an example of an analogue-digital converter.

By way of illustrative example, the converter is an analogue-digital converter 500 of the type represented in FIG. 5, comprising:

a comparator 501 having an input node e and an output node o;

a first capacitor c1 linking the node e to an input node E of the converter;

a second capacitor c2 linking the node e to a reference node RF of the converter; and a switch sw, for example an N-channel MOS transistor, having a drive node G (the gate of the MOS transistor in the example represented) and two conduction nodes linked respectively to the node e and to the node o.

By way of example, the input node E of the converter is connected to the conducting output track CL of the pixel, and the nodes RF and G receive respectively the signals RMP and AZ. The signal O delivered by the node o can be used to drive the storage of the state of a digital counter, not represented, of the converter. More particularly, the conversion of an analogue value applied to the node E into a digital value can comprise the following successive steps:

turning on the switch sw to reset the capacitances c1 and c2, and then turning back off the switch sw;

application of a voltage ramp to the node RF; and when the output signal of the comparator 501 changes state, storage of the value of the digital counter (not represented) of the converter, which constitutes the digital output value of the converter.

At an instant t0 of commencement of the acquisition phase $T_{frame}$, the signals AB, RST and TX_L are in the high state, thereby turning on (or placing in the on state) the transistors 111, 105 and 103, and consequently evacuating the photogenerated charge contained in the photodiode PPD2 to the node VRT, as well as the resetting of the readout node SN to a potential close to the potential VRT. The signals TG_M, TG_S, TG_L, TX_M, TX_S and RD remain for their part in the low state, so as to keep the transistors 107, 109, 101, 113, 115 and 119 off (disabled).

At an instant t1 subsequent to the instant to, the signal TG_L is placed in the high state, thereby turning on the transistor 101, and evacuating the photogenerated charge contained in the photodiode PPD1 to the node VRT (by way of the transistors 103 and 105).

At an instant t2 subsequent to the instant t1, the signal TG_L is placed back in the low state so as to turn back off the transistor 101, and thus isolate the photodiode PPD1 from the readout node SN.

At an instant t3 subsequent to the instant t2, the signal RST is placed back in the low state, so as to turn off the transistor 105, and thus isolate the readout node SN from the node VRT.

At an instant t4 subsequent to the instant t3, the signal TG_L is placed back in the high state, thereby turning on the transistor 101 and transferring, onto the readout node SN, the photogenerated charge contained in the photodiode PPD1.

At an instant t5 subsequent to the instant t4, the signal TG_L is placed back in the low state, this makes it possible to turn back off the transistor 101, and thus to isolate the photodiode PPD1 from the readout node SN.

The instant t5 marks the end of a phase of initialization of the photodiode PPD1, going from the instant t0 to the instant t5, and the commencement of the integration period $T_L$ of the photodiode PPD1.

At an instant t6 subsequent to the instant t5, the signal RST is placed back in the high state, thereby turning on the transistor 105 and resetting the readout node SN to a potential close to the potential of the node VRT.

At an instant t7 subsequent to the instant t6, the signal TX_S is placed in the high state, thereby turning on the transistor 115, and resetting the storage node ST_S to a potential close to the potential of the node VRT.

At an instant t8 subsequent to the instant t7, the signal TX_S is placed back in the low state, so as to turn off the transistor 115 and isolate the storage node ST_S.

At an instant t9 subsequent to the instant t8, the signal TX_M is placed in the high state, thereby turning on the transistor 113, and resetting the storage node ST_M to a potential close to the potential of the node VRT.

At an instant t10 subsequent to the instant t9, the signal TX_M is placed back in the low state, so as to turn off the transistor 113 and isolate the storage node ST_M.

At an instant t11 subsequent to the instant t10, the signal AB is placed in the low state, so as to turn on the transistor 111, and isolate the photodiode PPD2 from the node VRT.

The instant t11 marks the end of a phase of initialization of the photodiode PPD2, going from the instant t6 to the instant t11, and the commencement of the first integration sub-period of the integration period TS of the photodiode PPD2.

At an instant t12 subsequent to the instant t11, the signal TG_S is placed in the high state, thereby turning on the transistor 109, and transferring, onto the storage node ST_S, the photogenerated charge accumulated in the photodiode PPD2 since the instant t11.

At an instant t13 subsequent to the instant t12, the signal TG_S is placed back in the low state, so as to turn back off the transistor 109. The instant t13 marks the end of the first integration sub-period of the integration period $T_S$.

At an instant t14 subsequent to the instant t13, the signal AB is placed in the high state, so as to turn on the transistor 111 and to reset the photodiode PPD2.

At an instant t15 subsequent to the instant t14, the signal AB is placed back in the low state so as to isolate the photodiode PPD2 from the node VRT. The instant t15 marks the commencement of the first integration sub-period of the integration period $T_M$ of the photodiode PPD2.

At an instant t16 subsequent to the instant t15, the signal TG_M is placed in the high state, thereby turning on the transistor 107, and transferring, onto the storage node ST_M, the photogenerated charge accumulated in the photodiode PPD2 since the instant t15.

At an instant t17 subsequent to the instant t16, the signal TG_M is placed back in the low state, so as to turn back off the transistor 107. The instant t17 marks the end of the first integration sub-period of the integration period $T_M$.

The drive sequence for the signals AB, TG_M and TG_S going from the instant t10 to the instant t17 is repeated n times, where n is the number of sub-periods into which the integration periods $T_M$ and $T_S$ of the photodiode PPD2 are divided.

The instants of end of the last integration sub-period of the integration period TS, and of end of the last integration sub-period of the integration period $T_M$, are designated respectively by the references t18 and t19 in FIGS. 3 and 4.

Now passing to FIG. 4, at an instant t19' subsequent to the instant t19, the signal RD is placed in a high state, so as to turn on the readout transistor 119. Thus, a potential representative of the potential of the readout node SN is carried over to the output track CL by way of the transistors 117 and 119. Moreover, at an instant t20 subsequent to the instant t19', the signal RST is placed in the low state, so as to isolate the readout node SN from the node VRT.

At an instant t21 subsequent to the instant t20, the signal AZ is placed in a high state, so as to cause the resetting of the input capacitor or capacitors of a ramp-type analogue-digital converter whose input is linked to the conducting output track CL of the pixel.

At an instant t21' subsequent to the instant t21, the signal AZ is placed back in the low state, and then, at an instant t22 subsequent to the instant t21', a voltage ramp RMP is applied to a reference node of the converter.

At an instant t23 subsequent to the instant t22, the voltage ramp RMP reaches a level equivalent to the level of the input voltage of the analogue-digital converter, that is to say to the level of the potential of the output track CL of the pixel. At this instant, a digital output value VREFL of the analogue-digital converter, representative of the potential of the output track CL of the pixel, is read out and stored.

At an instant t24 subsequent to the instant t23, the signal TG_L is placed in the high state, thereby turning on the transistor 101, and transferring, onto the readout node SN, the photogenerated charge accumulated in the photodiode PPD1 since the instant t5.

At an instant t25 subsequent to the instant t24, marking the end of the integration period TL, the signal TG_L is placed back in the low state, so as to turn back off the transistor 101 and isolate the readout node SN from the photodiode PPD1.

At an instant t26 subsequent to the instant t25, a voltage ramp RMP is again applied to a reference node of the analogue-digital converter.

At an instant t27 subsequent to the instant t26, the voltage ramp RMP reaches a level equivalent to the level of the input voltage of the analogue-digital converter, that is to say to the level of the potential of the output track CL of the pixel. At this instant, a digital output value VL of the analogue-digital converter, representative of the potential of the output track CL of the pixel, is read out and stored.

The instant t27 marks the end of a phase of readout of a first output value $V_{OUTL}$ of the pixel, representative of the level of illumination received by the photodiode PPD1 of the pixel during the continuous integration period TL. More particularly, in this example, the first output value $V_{OUTL}$ of the pixel is defined as being equal to the value VREFL-VL.

At an instant t28 subsequent to the instant t27, the signal RST is placed in the high state, so as to turn on the transistor 105 and reset the readout node SN to a potential close to the potential of the node VRT.

At an instant t29 subsequent to the instant t28, while the transistor 105 is in the on state, the signal AZ is placed in a high state, so as to cause the resetting of the input capacitor or capacitors of the analogue-digital converter.

At an instant t30 subsequent to the instant t29, the signal AZ is placed back in the low state.

At an instant t31 subsequent to the instant t30, the signal RST is placed back in the low state, so as to isolate the readout node SN from the node VRT.

At an instant t32 subsequent to the instant t31, the signal TX_M is placed in a high state so as to turn on the transistor 113. The balancing of the charge between the nodes SN and ST_M then leads to a modification of the potential of the node SN, which modification is representative of the quantity of photogenerated charge accumulated in the capacitance MEM_M during the integration period $T_M$.

At an instant t33 subsequent to the instant t32, a voltage ramp RMP is applied to a reference node of the analogue-digital converter.

At an instant t34 subsequent to the instant t33, the voltage ramp RMP reaches a level equivalent to the level of the input voltage of the analogue-digital converter, that is to say to the level of the potential of the output track CL of the pixel. At this instant, a digital output value $V_M$ of the analogue-digital converter, representative of the potential of the output track CL of the pixel, is read out and stored.

At an instant t35 subsequent to the instant t34, the signal RST is placed back in the high state, so as to turn on the transistor 105 and reset the nodes SN and ST_M to a potential close to the potential of the node VRT.

At an instant t36 subsequent to the instant t35, the signal TX_M is placed back in the low state so as to turn back off the transistor 113 and isolate the node ST_M from the node SN. It will be noted that at this instant, for each pixel, exactly the same (to within temporal noise) signal level is reproduced on the node ST_M as at the instant t10.

At an instant t37 subsequent to the instant t36, the signal RST is placed back in the low state, so as to turn back off the transistor 105 and isolate the node SN from the node VRT.

At an instant t38 subsequent to the instant t37, the signal TX_M is placed back in the high state, so as to turn on the transistor 113.

At an instant t39 subsequent to the instant t38, a voltage ramp RMP is applied to the reference node of the analogue-digital converter.

At an instant t40 subsequent to the instant t39, the voltage ramp RMP reaches a level equivalent to the level of the input voltage of the analogue-digital converter, that is to say to the level of the potential of the output track CL of the pixel. At this instant, a digital output value $V_{REFM}$ of the analogue-digital converter, representative of the potential of the output track CL of the pixel, is read out and stored.

The instant t40 marks the end of a phase of readout of a second output value $V_{OUTM}$ of the pixel, representative of the level of illumination received by the photodiode PPD2 of the pixel during the discontinuous integration period $T_M$. More particularly, in this example, the second output value $V_{OUTM}$ of the pixel is defined as being equal to the value V $V_{REFM}-V_M$.

At an instant t41 subsequent to the instant t40, the signal TX_M is placed back in the low state, so as to turn on the transistor 113 and isolate the node ST_M from the node SN.

At an instant t42 subsequent to the instant t41, the signal RST is placed in the high state, so as to turn on the transistor 105 and reset the readout node SN to a potential close to the potential of the node VRT.

At an instant t43 subsequent to the instant t42, while the transistor 105 is in the on state, the signal AZ is placed in a high state, so as to cause the resetting of the input capacitor or capacitors of the analogue-digital converter.

At an instant t44 subsequent to the instant t43, the signal AZ is placed back in the low state.

At an instant t45 subsequent to the instant t44, the signal RST is placed back in the low state, so as to isolate the readout node SN from the node VRT.

At an instant t46 subsequent to the instant t45, the signal TX_S is placed in a high state so as to turn on the transistor 115. The balancing of the charge between the nodes SN and ST_S then leads to a modification of the potential of the node SN, which modification is representative of the quantity of photogenerated charge accumulated in the capacitance MEM_S during the integration period TS.

At an instant t47 subsequent to the instant t46, a voltage ramp RMP is applied to the reference node of the analogue-digital converter.

At an instant t48 subsequent to the instant t47, the voltage ramp RMP reaches a level equivalent to the level of the input voltage of the analogue-digital converter, that is to say to the level of the potential of the output track CL of the pixel. At this instant, a digital output value $V_S$ of the analogue-digital converter, representative of the potential of the output track CL of the pixel, is read out and stored.

At an instant t49 subsequent to the instant t48, the signal RST is placed back in the high state, so as to turn on the transistor 105 and reset the nodes SN and ST_S to a potential close to the potential of the node VRT.

At an instant t50 subsequent to the instant t49, the signal TX_S is placed back in the low state so as to turn back off the transistor 115 and isolate the node ST_S from the node SN. It will be noted that at this instant, for each pixel, exactly the same (to within temporal noise) signal level is reproduced on the node ST_S as at the instant t8.

At an instant t51 subsequent to the instant t50, the signal RST is placed back in the low state, so as to turn back off the transistor 105 and isolate the node SN from the node VRT.

At an instant t52 subsequent to the instant t51, the signal TX_S is placed back in the high state, so as to turn on the transistor 115.

At an instant t53 subsequent to the instant t52, a voltage ramp RMP is applied to the reference node of the analogue-digital converter.

At an instant t54 subsequent to the instant t53, the voltage ramp RMP reaches a level equivalent to the level of the input voltage of the analogue-digital converter, that is to say to the level of the potential of the output track CL of the pixel. At this instant, a digital output value $V_{REFS}$ of the analogue-digital converter, representative of the potential of the output track CL of the pixel, is read out and stored.

The instant t54 marks the end of a phase of readout of a third output value $V_{OUTS}$ of the pixel, representative of the level of illumination received by the photodiode PPD2 of the pixel during the discontinuous integration period $T_S$. More particularly, in this example, the second output value $V_{OUTS}$ of the pixel is defined as being equal to the value $V_{REFS}-V_S$.

A final output value of the pixel can be determined by taking account of the three output values $V_{OUTL}$, $V_{OUTM}$ and $V_{OUTS}$ read out.

At an instant t55 subsequent to the instant t54, the signal TX_S is placed back in the low state. The instant t55 marks the end of the acquisition phase Tframe.

An advantage of the drive method described in conjunction with FIGS. 3 and 4 is that it makes it possible to significantly decrease the noise generated by the sensor during the acquisition of an image, with respect to the examples of drive methods described in the above-mentioned patent application publications US2017/0118424 and US2017/0251153.

In particular, during the phase of readout of the output value $V_{OUTM}$ (respectively $V_{OUTS}$) of the pixel, the fact of reading out a signal value $V_M$ (respectively $V_S$) before a reference value $V_{REFM}$ (respectively $V_{REFS}$), makes it possible to reproduce strictly the same charge injection and coupling noise during the two readouts, and thus to obtain a very slightly noise-affected output value $V_{OUTM}$ (respectively $V_{OUTS}$).

Furthermore, the fact of reading out the values $V_M$ and $V_{REFM}$ (respectively $V_S$ and $V_{REFS}$) while the transistor 113 (respectively 115) is in the on state, makes it possible to minimize the temporal noise introduced into the output value $V_{OUTM}$ (respectively $V_{OUTS}$).

Moreover, during the phase of readout of the output value $V_{OUTM}$ (respectively $V_{OUTS}$) of the pixel, the fact of resetting the analogue-digital converter (signal AZ in the high state) while the transistor 105 is on (signal RST in the high state), rather than after the transistor 105 is turned back off (between the instants t31 and t32 or t45 and t46), makes it possible to limit the offset at the input of the analogue-digital converter while reading out the values $V_M$ and $V_{REFM}$ (respectively $V_S$ and $V_{REFS}$). Indeed, the potential carried over to the output track CL of the pixel when the transistor 105 is on (between the instants t28 and t31 or t42 and t45), is closer to the potential which will be carried over to the track CL during the phase of digitization of the reference value $V_{REFM}$ (respectively $V_{REFS}$) when the transistors 105 and 113 (respectively 115) will be respectively off and on (between the instants t33 and t34 or t47 and t48), than the potential which would be carried over to the output track CL of the pixel after the transistor 105 is turned back off (between the instants t31 and t32 or t45 and t46).

Diverse variants of the drive method described in conjunction with FIGS. 3 and 4 can be implemented.

In particular, although an exemplary embodiment has been described in which the transistor 103 is kept on during the phase of readout of the first output value $V_{OUTL}$ of the pixel, going from the instant t20 to the instant t27, the embodiments described are not limited to this particular case. Keeping the transistor 103 in the on state during the phase of readout of the first output value of the pixel, and in particular during the steps of reading out the values $V_{REFL}$ and $V_L$, has the effect of increasing the capacitance seen by the readout node SN of the pixel during these steps. This leads to the voltage levels read out on the output track CL of the pixel being decreased. Under conditions of low luminosity, it will be possible on the contrary to choose to turn off the transistor 103 during the steps of reading out the values $V_{REFL}$ and $V_L$, so as to increase the voltage levels read out on the output track CL of the pixel. Accordingly, the transistor 103 drive signal TX_L can for example be placed in the low state at the instant t20, and then placed back in the high state at the instant t28, the signal RST remaining in the high state for the whole of this period.

In another variant embodiment, the transistor 103 can be omitted, the node a1 then being connected to the node SN.

Moreover, the phases of initialization of the photodiodes PPD1 and PPD2, and/or of the capacitive storage nodes ST_M and ST_S, may be reversed. In particular, the order of the starting instants of the integration periods $T_L$, $T_M$ and $T_S$ may be different from that of the example of FIGS. 3 and 4.

Moreover, the order of readout of the three output values $V_{OUTL}$, $V_{OUTM}$ and $V_{OUTS}$ of the pixel may be different from that of the example of FIGS. 3 and 4.

Particular embodiments have been described. Diverse variants and modifications will be apparent to the person skilled in the art. In particular, described hereinabove are operational and drive method examples in which each of the integration periods $T_M$ and $T_S$ is split into n regularly spaced segments of the same duration $T_M/n$, respectively $T_S/n$. The embodiments described are not limited to this particular case however. By way of variant, the durations and/or the spacing of the integration sub-periods of the integration period $T_M$ may vary in the course of the acquisition phase $T_{frame}$. Likewise, the durations and/or the spacing of the integration sub-periods of the integration period $T_S$ may vary in the course of the acquisition phase $T_{frame}$.

By way of example, the durations of the integration sub-periods of the integration period $T_M$, and the durations of the integration sub-periods of the integration period $T_S$, may increase throughout the acquisition phase $T_{frame}$, or may decrease throughout the acquisition phase $T_{frame}$.

By way of variant, the durations of the integration sub-periods of the period $T_M$ on the one hand, and the durations of the integration sub-periods of the integration period $T_S$ on the other hand, may be constant throughout the acquisition phase $T_{frame}$, but be spaced pairwise by a variable duration, for example a duration which increases throughout the acquisition phase $T_{frame}$, or a duration which decreases throughout the acquisition phase $T_{frame}$.

By way of variant, the integration sub-periods of the integration period $T_M$ on the one hand, and the integration sub-periods of the integration period $T_S$ on the other hand, may be distributed randomly or semi-randomly throughout the acquisition phase $T_{frame}$.

Furthermore, the embodiments described are not limited to the examples described hereinabove in which the integration periods $T_M$ and $T_S$ are divided into one and the same number n of integration sub-periods. By way of variant, the integration period $T_M$ may be split into n integration sub-periods and the integration period $T_S$ may be split into n' integration sub-periods, with n and n' integers greater than 1, for example lying between 10 and 500, and n different from n'.

Figure 6:
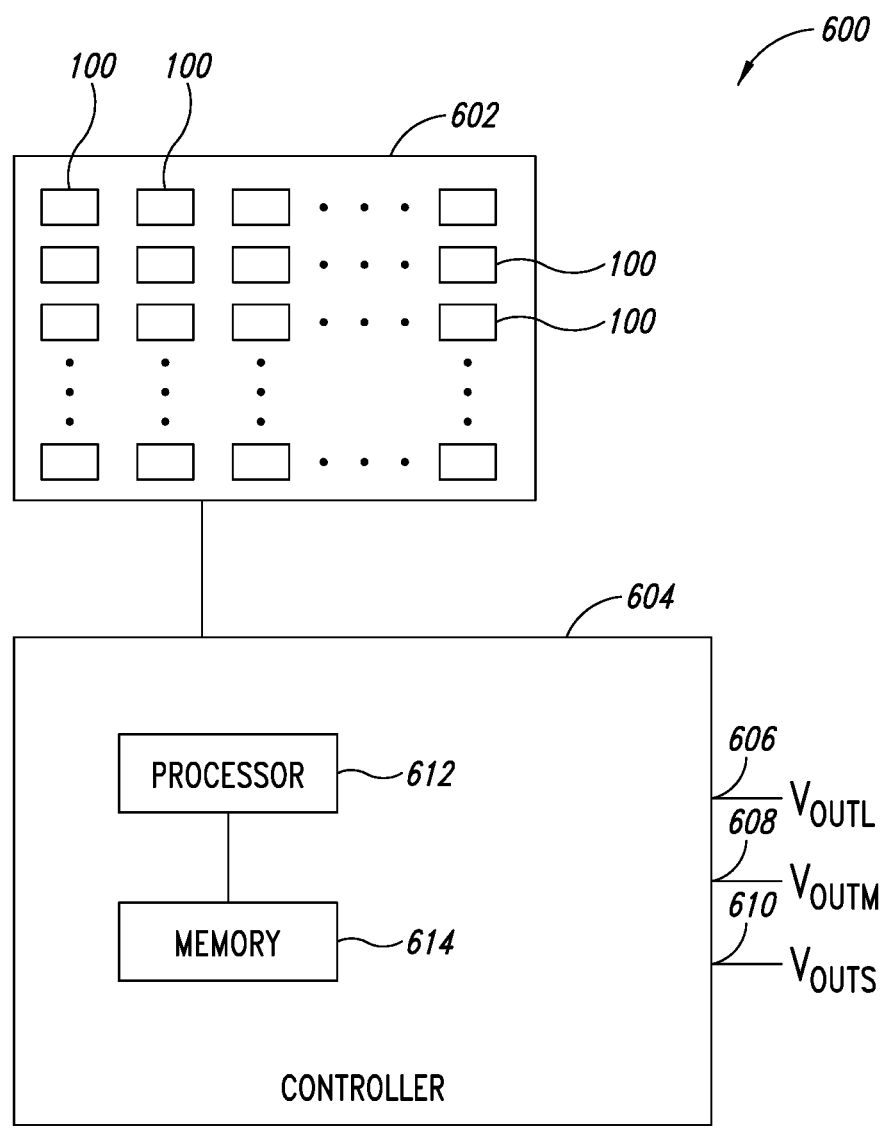
FIG. 6 is an image sensor according to one embodiment.

FIG. 6 schematically shows a partial electric diagram of an image sensor 600 according to an embodiment of the present disclosure. The image sensor 600 comprises an array 602 of pixels 100 of the type described in relation with FIG. 1. The transistors (not shown in FIG. 6) of pixels 100 of array 602 are controlled by a control circuit 604 that provides the various control and drive signals AB, RST, TX_L, TX_M, TX_S, TG_L, TG_M, TG_S, RD, AZ, RMP shown in FIGS. 1 and 5. The control circuit 604 also is coupled to output tracks CL (FIG. 1) of the sensor pixels 100. An analogue-digital converter, such as the analogue-digital converter 500 of FIG. 5, may be placed between each output track CL and the control circuit 604, or the analogue-digital converters may be placed within the control circuit 604. The control circuit 604 has three outputs 606, 608, and 610 that are respectively configured to output the output values $V_{OUTL}$, $V_{OUTM}$, $V_{OUTS}$. Alternatively, the analogue-digital converters, with or without post-processing circuitry, can be outside of the control circuit 604 and the outputs O of the analogue-digital converters could be output by the image sensor without passing to the control circuit 604.

The image sensor 600 further comprises a processor 612 and a memory 614. The processor 612 may include central processing units (CPU's), microprocessors, microcontrollers (MCU), digital signal processors (DSP), application specific integrated circuits (ASIC), state machines, and the like. Accordingly, the processor 612 may be implemented in hardware, firmware, or software, or some combination of at least two of the same. The functionality associated with the processor may be centralized or distributed, whether locally or remotely. The processor may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in the internal memory 614 or on external memory or may be hard-coded as a state machine or set of control signals. According to methods and devices referenced herein, one or more embodiments describe software executable by the processor, which when executed, carries out one or more of the method acts.

The memory 614 may include one or more memories, and may comprise any combination of volatile and non-volatile computer-readable media for reading and writing. As noted above, the memory 614 may store instructions used by the processor 612 to perform various functions, and may also store data, such as the various outputs of the pixels 100 of the array 602. Volatile computer-readable media includes, for example, random access memory (RAM). Non-volatile computer-readable media includes, for example, any one or more of read only memory (ROM), magnetic media such as a hard-disk, an optical disk drive, a flash memory device, a CD-ROM, and the like. The memory may be separated virtually or physically into separate areas, such as a first memory, a second memory, a third memory, etc. In these cases, it is understood that the different divisions of memory may be in different devices or embodied in a single memory.

Moreover, although described hereinabove are examples of high dynamic range image sensors in which each pixel provides three output values corresponding to three separate exposure levels, the embodiments described are not limited to this particular case.

In particular, the person skilled in the art will know to adapt the embodiments described to a sensor in which, at each acquisition, each pixel provides only two output values corresponding to two separate exposure levels. In this case, each phase of acquisition $T_{frame}$ of a value representative of the level of illumination of a pixel of the sensor can comprise a period of uninterrupted integration $T_L$ of the photodiode PPD1 of the pixel, and, in parallel with the integration period $T_L$, a single period of integration $T_M$ of the photodiode PPD2 of the pixel, the period $T_M$ being split into several disjoint integration sub-periods. In this case the transistors 109 and 115, as well as the storage capacitance MEM_S of the exemplary pixel that are described in conjunction with FIG. 2, may be omitted.

Moreover, the number of split and interleaved periods of integration of the photodiode PPD2 in the course of one and the same acquisition phase Tframe may be greater than 2.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An image sensor comprising:
    a plurality of pixels each including:
        a first photodiode;
        a capacitive readout node;
        a first transistor coupling the first photodiode to the capacitive readout node;
        a second photodiode;
        a first capacitive storage node;
        a second transistor coupling the second photodiode to the first capacitive storage node;
        a third transistor coupling the first capacitive storage node to the capacitive readout node;
        a reset node for applying a reset potential; and
        a fourth transistor coupling the readout node to the reset node; and
    a drive circuit configured to, during a phase of readout of a first value representative of a level of illumination received by the second photodiode of a selected pixel of the plurality of pixels during a first integration period, implement the following successive steps:
    a) turn on and then turn back off the fourth transistor so as to reset the readout node;
    b) turn on the third transistor and then read out a first signal representative of a potential of the readout node while the third transistor is on;
    d) turn on the fourth transistor so as to reset the readout node and the first storage node, and then turn back off the third transistor;
    e) turn back off the fourth transistor and then turn on the third transistor;
    f) read out a second signal representative of the potential of the readout node while the third transistor is on; and
    g) provide the first value representative of a difference between the second and first signals.

2. The image sensor according to claim 1, further comprising:
    an analogue-digital converter; and
    a conductive output track electrically coupled to an input of the analogue-digital converter, in which each pixel furthermore comprises:
        a fifth transistor connected as a source follower, and having a gate connected to the readout node,
        a sixth transistor linking a source of the fifth transistor to the conducting output track, the drive circuit being configured to reset the analogue-digital converter while the fourth transistor is on.

3. The image sensor according to claim 2, in which the first and second signals are digital output signals of the analogue-digital converter.

4. The image sensor according to claim 2, in which each pixel includes:
    a second capacitive storage node;
    a seventh transistor coupling the second photodiode to the second capacitive storage node;
    an eighth transistor coupling the second capacitive storage node to the readout node, wherein the drive circuit is configured to, during a phase of readout of a second value representative of a level of illumination received by the second photodiode of the selected pixel during a second integration period, implement the following successive steps:
    h) turn on and then turn back off the fourth transistor so as to reset the readout node;
    i) turn on the eighth transistor and then read out a third signal representative of a potential of the readout node while the eighth transistor is on;
    j) turn on the fourth transistor so as to reset the readout node and the second storage node, and then turn back off the eighth transistor;
    k) turn back off the fourth transistor and then turn on the eighth transistor;
    l) read out a fourth signal representative of the potential of the readout node while the eighth transistor is on; and
    m) provide the second value representative of a difference between the fourth and third signals.

5. The image sensor according to claim 4, in which the drive circuit is configured to, in step h), drive a resetting of the analogue-digital converter while the fourth transistor is on.

6. The image sensor according to claim 4, in which each of the first and second integration periods is split into a plurality of disjoint sub-periods, the sub-periods of the first integration period and the sub-periods of the second integration period being interleaved.

7. The image sensor according to claim 4, in which the drive circuit is configured to, during a phase of readout of a third value representative of an illumination level received by the first photodiode of the selected pixel during a third integration period, implement the following successive steps:
    n) turn on and then turn back off the fourth transistor so as to reset the readout node
    o) read out a fifth signal representative of the potential of the readout node
    p) turn on and then turn back off the first transistor so as to transfer onto the readout node a photogenerated charge contained in the first photodiode
    q) read out a sixth signal representative of the potential of the readout node; and
    r) provide the third value representative of a difference between the fifth and sixth signals.

8. The image sensor according to claim 7, in which the drive circuit is configured to, between steps n) and o), drive the resetting of the analogue-digital converter while the fourth transistor is off.

9. The image sensor according to claim 7, in which the third integration period is a continuous period.

10. The image sensor according to claim 1, in which, in each pixel, the fourth transistor links the reset node to an intermediate node, each pixel furthermore comprising a fifth transistor linking the intermediate node to the readout node.

11. The image sensor according to claim 1, in which, in each pixel, the fourth transistor directly links the reset node to the readout node.

12. The image sensor according to claim 1, in which each pixel furthermore comprises a fifth transistor linking the second photodiode to the reset node.

13. An imaging method using an image sensor that includes a plurality of pixels each including a first photodiode, a capacitive readout node, a first transistor coupling the first photodiode to the capacitive readout node, a second photodiode, a first capacitive storage node, a second transistor coupling the second photodiode to the first capacitive storage node, a third transistor coupling the first capacitive storage node to the capacitive readout node, a reset node for applying a reset potential, and a fourth transistor coupling the readout node to the reset node, the method comprising:
  performing a first readout phase that reads out a first value representative of a level of illumination received by the second photodiode of a selected pixel of the plurality of pixels during a first integration period, the performing including implementing the following successive steps:
  a) turning on and then turning back off the fourth transistor so as to reset the readout node;
  b) turning on the third transistor and then reading out a first signal representative of a potential of the readout node while the third transistor is on;
  d) turning on the fourth transistor so as to reset the readout node and the first storage node, and then turning back off the third transistor;
  e) turning back off the fourth transistor and then turning on the third transistor;
  f) reading out a second signal representative of the potential of the readout node while the third transistor is on; and
  g) providing the first value representative of a difference between the second and first signals.

14. The method according to claim 13, in which each pixel includes a fifth transistor connected as a source follower and having a gate connected to the readout node, a sixth transistor linking a source of the fifth transistor to a conducting output track that is electrically coupled to an input of an analogue-digital converter, a second capacitive storage node, a seventh transistor coupling the second photodiode to the second capacitive storage node, and an eighth transistor coupling the second capacitive storage node to the readout node, the method further comprising, during a phase of readout of a second value representative of a level of illumination received by the second photodiode of the selected pixel during a second integration period, implementing the following successive steps:
  h) turning on and then turning back off the fourth transistor so as to reset the readout node;
  i) turning on the eighth transistor and then reading out a third signal representative of a potential of the readout node while the eighth transistor is on;
  j) turning on the fourth transistor so as to reset the readout node and the second storage node, and then turning back off the eighth transistor;
  k) turning back off the fourth transistor and then turning on the eighth transistor;
  l) reading out a fourth signal representative of the potential of the readout node while the eighth transistor is on; and
  m) providing the second value representative of a difference between the fourth and third signals.

15. The method according to claim 14, wherein step h) includes resetting the analogue-digital converter while the fourth transistor is on.

16. The method according to claim 14, further comprising, during a phase of readout of a third value representative of an illumination level received by the first photodiode of the selected pixel during a third integration period, implementing the following successive steps:
  n) turning on and then turning back off the fourth transistor so as to reset the readout node
  o) reading out a fifth signal representative of the potential of the readout node
  p) turning on and then turning back off the first transistor so as to transfer onto the readout node a photogenerated charge contained in the first photodiode
  q) reading out a sixth signal representative of the potential of the readout node; and
  r) providing the third value representative of a difference between the fifth and sixth signals.

17. An image sensor comprising:
  a plurality of pixels each including a first photodiode, a capacitive readout node, a second photodiode, a first capacitive storage node, a first transistor coupling the first capacitive storage node to the capacitive readout node, a reset node for applying a reset potential, and a second transistor coupling the readout node to the reset node; and
  a drive circuit configured to, during a phase of readout of a first value representative of a level of illumination received by the second photodiode of a selected pixel of the plurality of pixels during a first integration period, implement the following steps:
  turn on and then turn back off the second transistor so as to reset the readout node;
  turn on the first transistor and then read out a first signal representative of a potential of the readout node while the first transistor is on;
  turn on the second transistor so as to reset the readout node and the first storage node, and then turn back off the first transistor;
  turn back off the second transistor and then turn on the first transistor;
  read out a second signal representative of the potential of the readout node while the first transistor is on; and
  provide the first value representative of a difference between the second and first signals.

18. The image sensor according to claim 17, further comprising:
  an analogue-digital converter; and
  a conductive output track electrically coupled to an input of the analogue-digital converter, in which each pixel furthermore comprises:
  a third transistor connected as a source follower, and having a gate connected to the readout node,
  a fourth transistor linking the third transistor to the conducting output track, the drive circuit being configured to reset the analogue-digital converter while the second transistor is on.

19. The image sensor according to claim 18, in which each pixel includes:
  a second capacitive storage node;
  a fifth transistor coupling the second photodiode to the second capacitive storage node;
  an sixth transistor coupling the second capacitive storage node to the readout node, wherein the drive circuit is configured to, during a phase of readout of a second value representative of a level of illumination received by the second photodiode of the selected pixel during a second integration period, implement the following steps:

turn on and then turn back off the second transistor so as to reset the readout node;

turn on the sixth transistor and then read out a third signal representative of a potential of the readout node while the sixth transistor is on;

turn on the second transistor so as to reset the readout node and the second storage node, and then turn back off the sixth transistor;

turn back off the second transistor and then turn on the sixth transistor;

read out a fourth signal representative of the potential of the readout node while the sixth transistor is on; and provide the second value representative of a difference between the fourth and third signals.

* * * * *